(12) United States Patent
Sugaya

(10) Patent No.: US 9,532,181 B2
(45) Date of Patent: Dec. 27, 2016

(54) DEVICE RETRIEVAL SERVER, METHOD OF RETRIEVING DEVICE, AND PROGRAM FOR DEVICE RETRIEVAL SERVER

(71) Applicant: OPTiM Corporation, Saga (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/042,242

(22) Filed: Feb. 12, 2016

(65) Prior Publication Data
US 2016/0353247 A1    Dec. 1, 2016

(30) Foreign Application Priority Data

May 26, 2015  (JP) .................................. 2015-106643

(51) Int. Cl.
*H04W 4/02*    (2009.01)
*H04W 8/22*    (2009.01)

(52) U.S. Cl.
CPC ............... *H04W 4/028* (2013.01); *H04W 8/22* (2013.01)

(58) Field of Classification Search
CPC ............................... G06F 17/30; G06F 3/1212
See application file for complete search history.

(56) References Cited

U.S. PATENT DOCUMENTS

| 2002/0054316 A1* | 5/2002 | Abe | G06F 3/1212 |
| | | | 358/1.14 |
| 2010/0057725 A1* | 3/2010 | Matsumura | G06F 17/30 |
| | | | 707/E17.017 |

FOREIGN PATENT DOCUMENTS

JP    2007-115053    5/2007

* cited by examiner

*Primary Examiner* — Myron K Wyche
(74) *Attorney, Agent, or Firm* — Lex IP Meister, PLLC

(57) ABSTRACT

The present invention is to provide a device retrieval server, a method of retrieving a device, and a program for a device retrieval server, which can easily select a device with a function that a user desires. The device retrieval server 10 communicatively connected with a device 200 previously associates and stores an identifier and location data of the device 200 with function data on an executable function of the device 200; receives a retrieval request for a location and a function from a user terminal 100; and references the location data and the function data stored in the device retrieval server 10 in response to the retrieval request and transmits an identifier of the device 200 to the user terminal 100.

13 Claims, 8 Drawing Sheets

Fig. 2
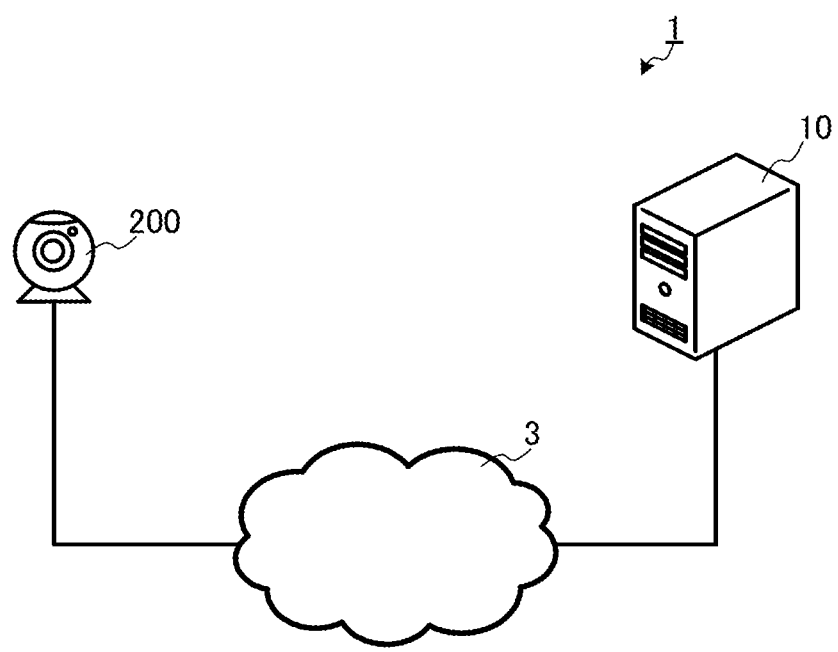
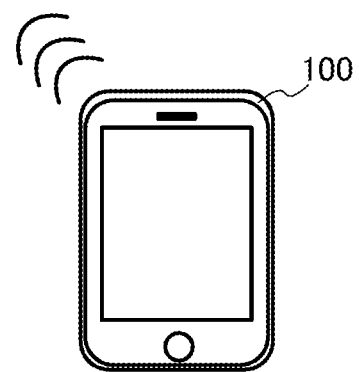

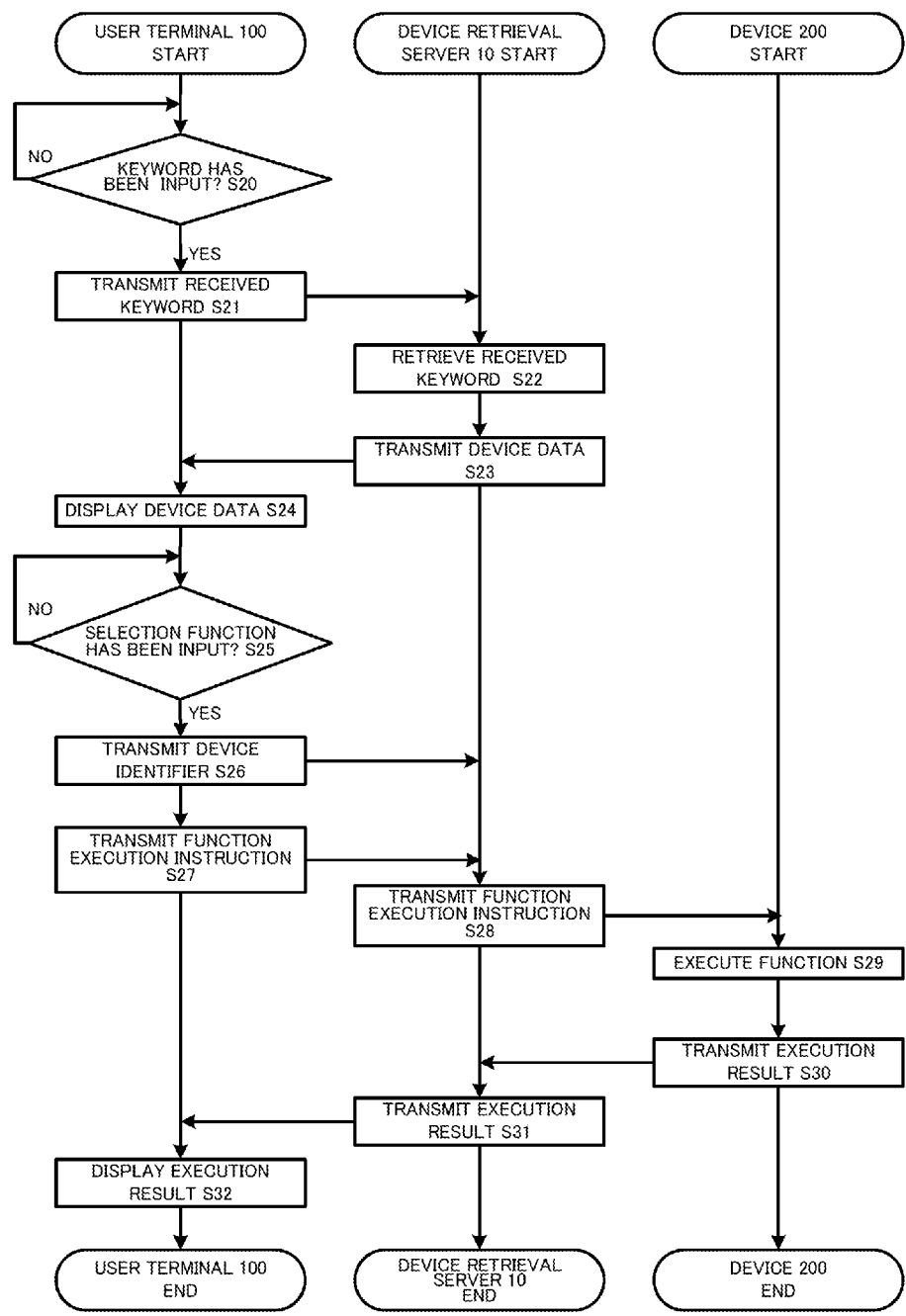

Fig. 6

DEVICE DATA TABLE

| DEVICE IDENTIFIER | TAG DATA | LOCATION DATA | DEVICE TYPE DATA | FUNCTION DATA |
|---|---|---|---|---|
| AAAA-C01 | Park A<br>Camera<br>Near entrance<br>Imaging | Park A<br>Near entrance<br>XX° XX' X.XX"N,YY° YY' YY.YY"E | Web camera | Taking moving image<br>Taking still image<br>Using timer |
| AAAA-C02 | Park A<br>Camera<br>Near fountain<br>Imaging | Park A<br>Near fountain<br>xx° xx' x.xx"N,yy° yy' yy.yy"E | Web camera | Taking moving image<br>Taking still image<br>Using timer |

DEVICE RETRIEVAL SERVER, METHOD OF RETRIEVING DEVICE, AND PROGRAM FOR DEVICE RETRIEVAL SERVER

CROSS REFERENCE TO RELATED APPLICATIONS

This application claims priority to Japanese Patent Application No. 2015-106643 filed on May 26, 2015, the entire contents of which are incorporated by reference herein.

TECHNICAL FIELD

The present invention relates to a device retrieval server, a method of retrieving a device, and a program for a device retrieval server, to retrieve a communicatively-connected device.

BACKGROUND ART

Recently, digital information appliances such as televisions and digital cameras have been connected with the Internet to transmit images, voices, and character information to highly-functional mobile terminals such as smart phones and tablet terminals through the Internet. For example, images taken by web cameras are transmitted to highly-functional mobile terminals, etc., through the Internet and displayed on the terminals.

Moreover, transmitting information whether or not an operation is conducted for a previously set device to highly-functional mobile terminals, etc. through the Internet (for example, refer to Patent Document 1).

CITATION LIST

Patent Literature

Patent Document 1: JP 2007-115053 A

SUMMARY OF INVENTION

According to Patent Document 1, an operation for this device is detected with a sensor equipped in a device, and then the detection result is transmitted to a highly-functional mobile terminal, etc., through a public line network such as the Internet.

However, in the method described in Patent Document 1, a previously registered operation for devices can be detected but cannot be conducted from highly-functional mobile terminals. Furthermore, only previously registered devices are to be detected so that non-registered devices may not be recognized. Yet furthermore, devices that users desire are hardly retrieved and used.

Then, the present invention focuses on the solution that devices with functions that the user desires can be easily selected by retrieving the desired device from a user terminal.

An objective of the present invention is to provide a device retrieval server, a method of retrieving a device, and a program for a device retrieval server, which can easily select a device with a function that a user desires.

According to the first aspect of the present invention, a device retrieval server retrieving a device, the device retrieval server being communicatively connected with the device, includes:

a device data storing unit that previously associates and stores an identifier and location data of the device with function data on an executable function of the device;

a receiving unit that receives a retrieval request for a location and a function from a user terminal; and a retrieval result transmitting unit that references the location data and the function data stored in the device data storing unit in response to the retrieval request and transmits the identifier of the device to the user terminal.

According to the first aspect of the present invention, a device retrieval server retrieving a device, the device retrieval server being communicatively connected with the device previously associates and stores an identifier and location data of the device with function data on an executable function of the device; receives a retrieval request for a location and a function from a user terminal; and references the stored location data and function data in response to the retrieval request and transmits the identifier of the device to the user terminal.

The first aspect of the present invention falls into the category of a device retrieval server, but the categories of a method of retrieving a device and a program for a device retrieval server have the same functions and effects.

According to the second aspect of the present invention, in the device retrieval server according to the first aspect of the present invention, the retrieval result transmitting unit transmits the function data of the device in addition to the identifier.

According to the second aspect of the present invention, the device retrieval server according to the first aspect of the present invention transmits the function data of the device in addition to the identifier.

According to the third aspect of the present invention, in the device retrieval server according to the first or second aspect of the present invention, the retrieval result transmitting unit transmits the identifier, the function data, and a link to execute a function of the device.

According to the third aspect of the present invention, the device retrieval server according to the first or second aspect of the present invention transmits the identifier, the function data, and a link to execute a function of the device.

According to the fourth aspect of the present invention, a method of retrieving a communicatively connected device includes the steps of:

previously associating and storing an identifier and location data of the device with function data on an executable function of the device;

receiving a retrieval request for a location and a function from a user terminal; and referencing the stored location data and function data in response to the retrieval request and transmitting the identifier of the device to the user terminal.

According to the fifth aspect of the present invention, a computer program product for use in a device retrieval server retrieving a device, the device retrieval server being communicatively connected with the device, include a non-transitory computer usable medium having a set of instructions physically embodied therein, the set of instructions including computer readable program code, which when executed by the device retrieval server causes the information processing unit to:

previously associate and store an identifier and location data of the device with function data on an executable function of the device;

receive a retrieval request for a location and a function from a user terminal; and reference the stored location data and function data in response to the retrieval request and transmit the identifier of the device to the user terminal.

The present invention can provide a device retrieval server, a method of retrieving a device, and a program for a device retrieval server, which can easily select a device with a function that a user desires.

BRIEF DESCRIPTION OF DRAWINGS

FIG. 2 shows an overall configuration diagram of the device retrieval system 1.

FIG. 5 shows a flow chart of the device register process executed by the device retrieval server 10, the user terminal 100, and the device 200.

FIG. 6 shows the device data table stored by the device retrieval server 10.

DESCRIPTION OF EMBODIMENTS

Embodiments of the present invention will be described below with reference to the attached drawings. However, this is illustrative only, and the technological scope of the present invention is not limited thereto.

Overview of Device Retrieval System 1

Figure 1:
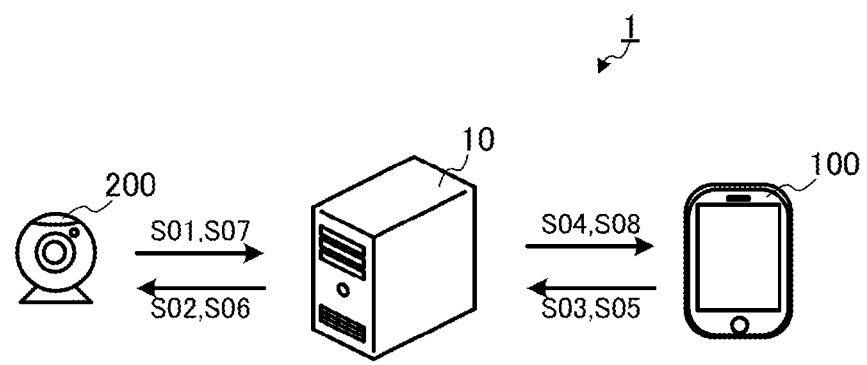
FIG. 1 shows a schematic diagram of the device retrieval system 1.
Figure 3:
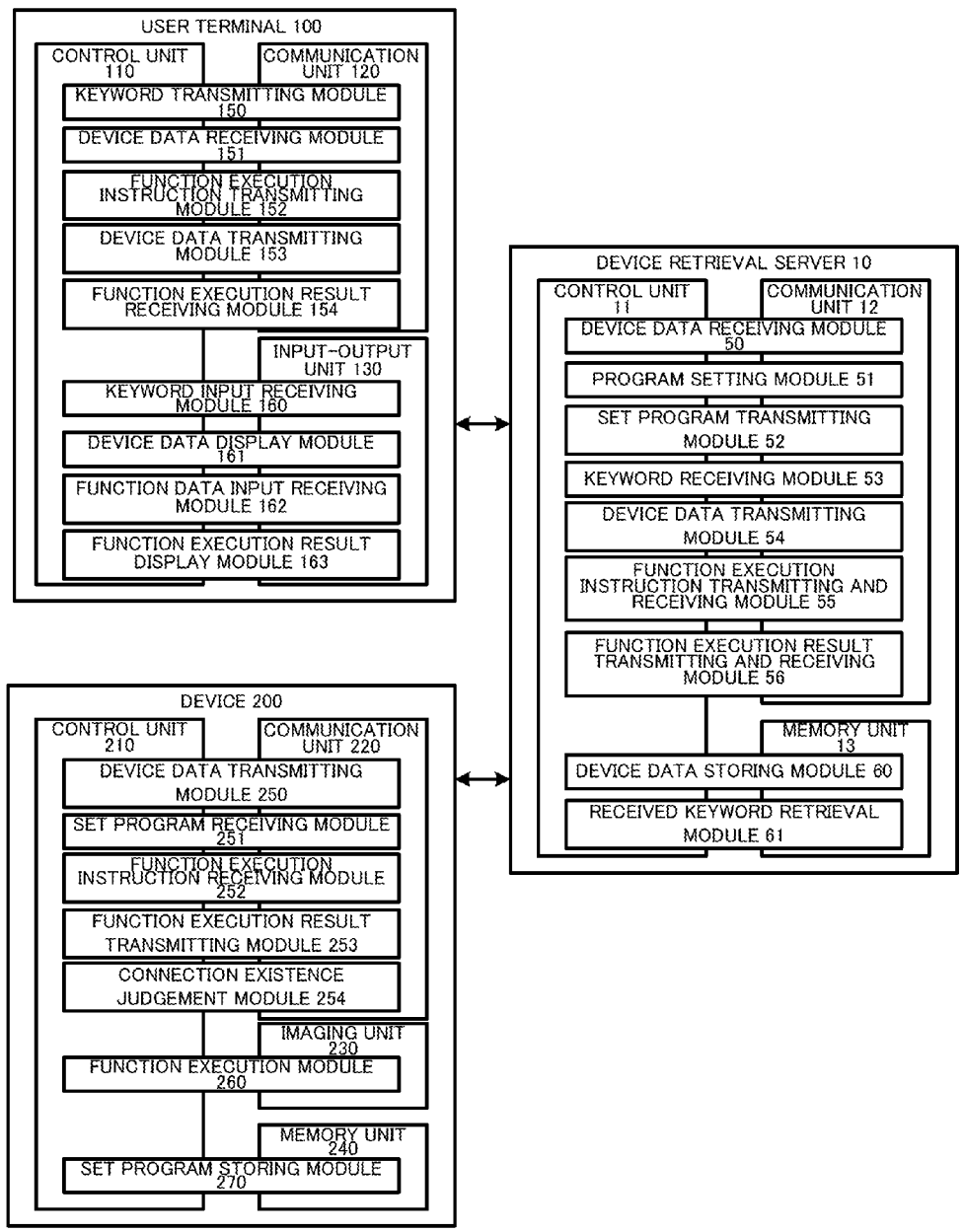
FIG. 3 shows a functional block diagram of the device retrieval server 10, the user terminal 100, and the device 200.

The overview of the present invention will be described below with reference to FIG. 1. The device retrieval system 1 includes a device retrieval server 10, a user terminal 100, and a device 200.

The device retrieval server 10 is communicatively connected with the user terminal 100 and the device 200. The device retrieval server 10 has a data communication function to perform data communication with the user terminal 100 and the device 200.

The user terminal 100 has a data communication function, which is a home or office electrical appliance performing data communication with the device retrieval server 10. Examples of the user terminal 100 include information appliances such as a mobile phone, a mobile information terminal, a personal computer, a net book terminal, a slate terminal, an electronic book terminal, and a portable music player.

The device 200 has a data communication function. Examples of the device 200 include various electrical appliances such as web cameras and home appliances; livingwares; pet supplies; and lockers such as vehicles, houses, and facilities, which perform data communication with the device retrieval server 10. This embodiment has one device 200 but may have a plurality of devices 200. The plurality of devices 200 may not be of all the same types.

First, in the device retrieval system 1, a device 200 transmits its device data to the device retrieval server 10 (step S01). In the step S01, the device data transmitted from a device 200 to the device retrieval server 10 contains an device identifier identifying the device 200, tag data tagging a key word to retrieve the device 200, location data indicating a location at which the device 200 is installed, device type data indicating a device type of the device 200, and function data indicating an executable function of the device 200. The device data may contain other data or may be any one of the above-mentioned data. In this embodiment, the device 200 is a web camera.

The device retrieval server 10 receives the device data transmitted from the device 200. The device retrieval server 10 associates and stores the received device data. Specifically, the device retrieval server 10 associates and stores the device identifier with the tag data, the location data, the device type data, and the function data.

Then, the device retrieval server 10 sets a program executing a function of the device 200 based on function data contained in the stored device data. The device retrieval server 10 transmits a set program for the device 200 to execute a function to the device 200 (step S02). In the step S02, for example, the program transmitted from the device retrieval server 10 is to start and to end taking a moving image based on a command from the device retrieval server 10 when a device 200 takes a moving image, to take a still image based on a command from the device retrieval server 10 when a device 200 takes a still image, or to take an image on a specified date and time based on a command from the device retrieval server 10 when a device 200 takes an image with the timer.

The device 200 receives the set program transmitted from the device retrieval server 10. The device 200 stores the received set program.

Then, the user terminal 100 receives an input of a keyword to retrieve a device with a function that the user desires. For example, the keyword that the user terminal 100 receives represents a location, a function, a device type, a device identifier, etc. The user terminal 100 transmits the received keyword to the device retrieval server 10 (step S03).

The device retrieval server 10 receives the keyword transmitted from the user terminal 100. The device retrieval server 10 retrieves data from the stored device data with the received keyword. As the result, if tag data or location data corresponding to the received keyword exist, the device retrieval server 10 transmits the tag data or the location data, a device identifier, device type data, and function data that are associated with this tag data or location data, to the user terminal 100 (step S04). In the step S04, the function data is transmitted from the device retrieval server 10 as a link to execute a function of a device 200.

The user terminal 100 receives the device identifier, the tag data, the location data, the device type data, and the function data that are transmitted from the device retrieval server 10, as device data. The user terminal 100 displays the received data. The function data displayed on the user terminal 100 contains a link to a program executing a function.

The user terminal 100 receives an input for displayed function data. Specifically, if receiving a tap operation for displayed function data, the user terminal 100 transmits a function execution instruction corresponding to the function data to the device retrieval server 10 (step S05). In the step S05, the user terminal 100 transmits a device identifier associated with the function data for which an input is received in addition to a function execution instruction, to the device retrieval server 10.

The device retrieval server 10 receives the function execution instruction and the device identifier that are transmitted from the user terminal 100. The device retrieval server 10 transmits a function execution instruction to a device 200 with the received device identifier (step S06).

The device 200 receives the function execution instruction transmitted from the device retrieval server 10. The device 200 executes the function instructed from the received instruction. The device 200 transmits an execution result of the function to the device retrieval server 10 (step S07). In the step S07, the execution result is a taken moving or still image and a moving or still image taken with the timer, for example.

The device retrieval server 10 receives a moving or a still image transmitted from the device 200 as the execution result of the function. The device retrieval server 10 transmits the moving or still image to the user terminal 100 as the received execution result of the function (step S08).

The user terminal 100 receives the moving or still image as the execution result of the function that is transmitted from the device retrieval server 10. The user terminal 100 displays the moving or still image. When the device 200 is a different item, a function corresponding to this item is executed, and the execution result of the function is displayed.

System Configuration of Device Retrieval System 1

FIG. 2 shows a system configuration of the device retrieval system 1 according to a preferable embodiment of the present invention. The device retrieval system 1 includes a device retrieval server 10, a user terminal 100, a device 200, and a public line network 3 (e.g. the Internet network, a third and a fourth generation networks).

The device retrieval server 10 has the functions to be described later and a capability of performing data communication to retrieve a device.

The user terminal 100 has functions to be described later and a capability of data communication, which is a home or office appliance. Examples of the user terminal 100 include information appliances such as a mobile phone, a portable information terminal, a net book terminal, a slate terminal, an electronic book terminal, and a portable music player.

The device 200 has functions to be described later and a capability of data communication, which is a home or office appliance executing various functions. Examples of the device 200 include electrical appliances such as computer devices such as web cameras and PCs, and home appliances; livingwares; pet supplies; and lockers such as vehicles, houses, and facilities. This embodiment will be explained, assuming that the device 200 is a web camera as an example.

Functions

The device retrieval server 10 includes a control unit 11 provided with a central processing unit (hereinafter referred to as "CPU"), a random access memory (hereinafter referred to as "RAM"), and a read only memory (hereinafter referred to as "ROM") and a communication unit 12 such as a device with a capability of communicating with other electrical appliances and wireless access points, for example, a Wi-Fi® enabled device complying with IEEE 802.11 or a device connectable with a cable.

The device retrieval server 10 also includes a memory unit 13 such as a hard disk, a semiconductor memory, a record medium, or a memory card to store data. The memory unit 13 includes a device data table to be described later.

In the device retrieval server 10, the control unit 11 reads a predetermined program to run a device data receiving module 50, a program setting module 51, a set program transmitting module 52, a keyword receiving module 53, a device data transmitting module 54, a function execution instruction transmitting and receiving module 55, and a function execution result transmitting and receiving module 56 in cooperation with the communication unit 12. Furthermore, in the device retrieval server 10, the control unit 11 reads a predetermined program to run a device data storing module 60 and a received keyword retrieval module 61 in cooperation with the memory unit 13.

In the same way as the device retrieval server 10, the user terminal 100 includes a control unit 110 provided with a CPU, a RAM, and a ROM; and a communication unit 120 such as a device with a capability of communicating with other electrical appliances and wireless access points, for example, a Wi-Fi® enabled device complying with IEEE 802.11 or a device connectable with a cable.

The user terminal 100 also includes an input-output unit 130 including a display unit outputting and displaying data and images that have been processed by the control unit; and also including a touch panel, a keyboard, and a mouse that receive an input from a user.

In the user terminal 100, the control unit 110 reads a predetermined program to run a keyword transmitting module 150, a device data receiving module 151, a function execution instruction transmitting module 152, a device data transmitting module 153, and a function execution result receiving module 154 in cooperation with the communication unit 120. Furthermore, in the user terminal 100, the control unit 110 reads a predetermined program to run a keyword input receiving module 160, a device data display module 161, a function data input receiving module 162, and a function execution result display module 163 in cooperation with the input-output unit 130.

In the same way as the device retrieval server 10 and the user terminal 100, the device 200 includes a control unit 210 provided with a CPU, a RAM, and a ROM; and a communication unit 220 such as a device with a capability of communicating with other electrical appliances and wireless access points, for example, a Wi-Fi® enabled device complying with IEEE 802.11 or a device connectable with a cable.

The device 200 also includes an imaging unit 230 such as an imaging device such as a charge-coupled device (hereinafter referred to as "CCD") or a complementary metal oxide semiconductor (hereinafter referred to as "CMOS"). The device 200 also includes a memory unit 240 such as a hard disk, a semiconductor memory, a record medium, or a memory card to store data.

In the device 200, the control unit 210 reads a predetermined program to run a device data transmitting module 250, a set program receiving module 251, a function execution instruction receiving module 252, a function execution result transmitting module 253, and a connection existence judgement module 254 in cooperation with the communication unit 220. Furthermore, in the device 200, the control unit 210 reads a predetermined program to run a function execution module 260 in cooperation with the imaging unit 230. Still furthermore, in the device 200, the control unit 210 reads a predetermined program to run a set program storing module 270 in cooperation with the memory unit 240.

Device Register Process

Figure 4:
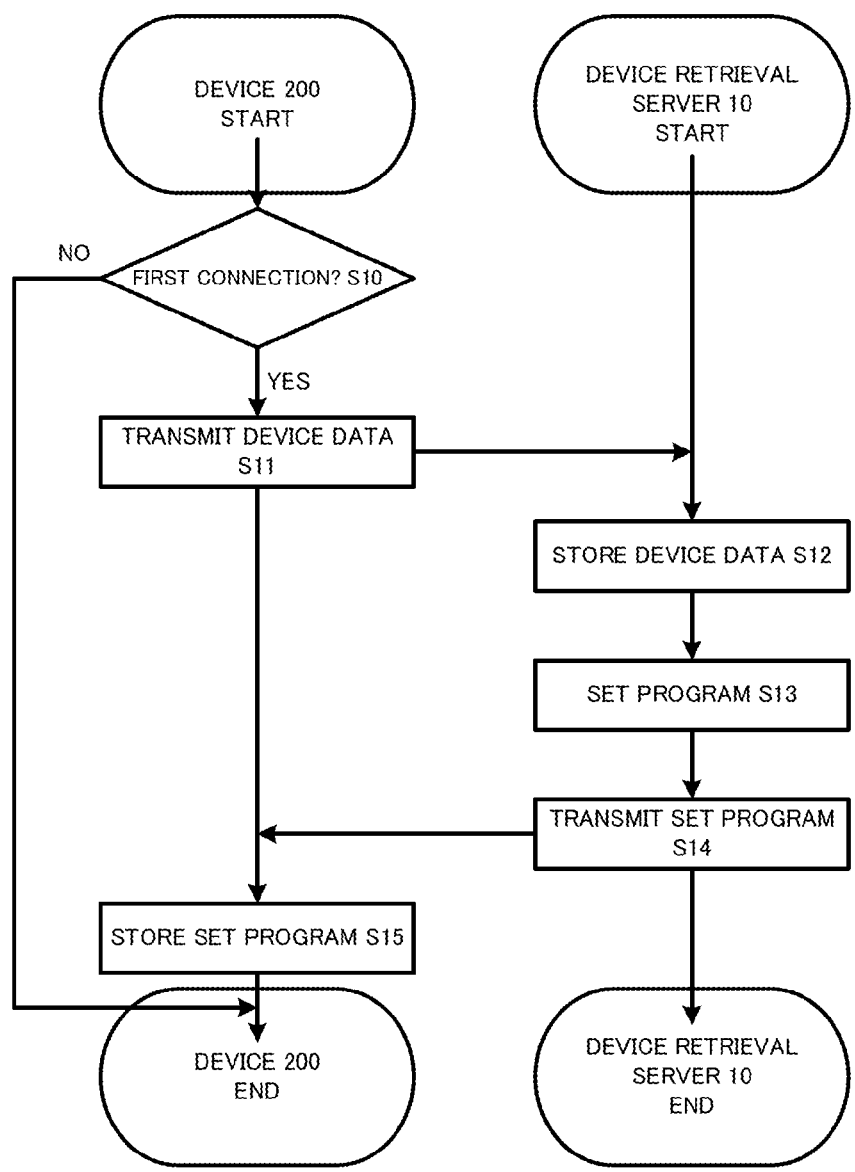
FIG. 4 shows a flow chart of the device register process executed by the device retrieval server 10 and the device 200.

FIG. 4 shows a flow chart of the device register process executed by the device retrieval server 10 and the device 200. The tasks executed by the modules of the above-mentioned devices are explained below together with this process.

First, the connection existence judgement module 254 of a device 200 judges whether or not the device 200 has been connected with a public line network 3 (step S10). In the step S10, if judging that the device 200 has been first connected with a public line network 3 (NO), the connection existence judgement module 254 ends this process. On the other hand, if the connection existence judgement module 254 that the device 200 was not connected in the past but has just connected with a public line network 3 (YES) in the step S10, the device data transmitting module 250 of the device 200 transmits device data to the device retrieval server 10 (step S11).

In the step S11, the device data transmitted from the device data transmitting module 250 contains an device identifier identifying the device 200, tag data tagging a key word to retrieve the device 200, location data indicating a location at which the device 200 is installed, device type data indicating a device type of the device 200, and function data indicating an executable function of the device 200. The device data may contain other data or may be any one of the data. In this embodiment, the device 200 is a web camera.

In the step S11, the device identifier transmitted from the device data transmitting module 250 identifies a device 200, which is set when the device 200 is shipped or installed. The device identifier may be a product number, a unique number, etc., of the device 200. The device identifier may be set by the device retrieval server 10 based on a product number, a unique number, etc., that are transmitted from the device 200.

In the step S11, the tag data transmitted from the device data transmitting module 250 is a keyword previously set in a device 200 itself. The tag data is a keyword set when the device 200 is shipped or installed. The tag data may a keyword related to the device type of the device 200, a location at which the device 200 is installed, or a keyword related to this location, which may be set by a person who installs the device 200. The tag data may be set by the device retrieval server 10 based on this keyword contained in the tag data transmitted from the device 200.

In the step S11, the location data transmitted by the device data transmitting module 250 is based on a keyword related to the location at which the device 200 is installed and the own GPS data acquired by the device 200. The location data may be set in the device 200 based on the GPS data of a location at which the device 200 is installed that a person who installs the device 200 acquires with a different device, etc. The person who installs the device 200 may set data different from a location at which the device 200 is installed and from a keyword and GPS data that are related to this location. The location data may also be set by the device retrieval server 10 based on the GPS data, the keyword, etc., of the device 200 that are transmitted to the device retrieval server 10.

In the step S11, the device type data transmitted from the device data transmitting module 250 indicates the device name of the device 200, which is set when the device 200 is shipped or installed. The device type data may be set by a person who installs the device 200, based on the type of the device 200 and a keyword related to the device 200. The device type data may also be set by the device retrieval server 10 based on data such as the product information and the product ID of the device 200 from which the device type can be recognized that is transmitted to the device retrieval server 10.

In the step S11, the function data transmitted from the device data transmitting module 250 indicates a function of the device 200. The function data may be set by a person who installs the device 200 based on a function of this device 200. The function data may be related to a function set when the device 200 is shipped or installed. The function data may be set based on the device type data and the device identifier that are received by the device retrieval server 10.

The device data receiving module 50 of the device retrieval server 10 receives the device data transmitted from the device 200. The device data storing module 60 of the device retrieval server 10 associates and stores the received device data (step 12). In the step S12, the device data storing module 60 associates and stores the device identifier with the tag data, the location data, the device type data, and the function data in the device data table shown in FIG. 6.

Device Data Table

FIG. 6 shows the device data table stored by the device data storing module 60. In FIG. 6, the device identifier is associated and stored with the tag data, the location data, the device type data, and the function data. The device identifier identifies a device 200. The device data storing module 60 stores "AAAA-001" and "AAAA-C02." The tag data includes a plurality of keywords specifying a device 200. The device data storing module 60 stores "Park A, Camera, Near entrance, Imaging" and "Park A, Camera, Near fountain, Imaging." The location data indicates a location at which a device 200 is installed, based on the keyword indicating a location or GPS data. The device data storing module 60 stores "Park A, Near entrance, XX°XX'X.XX"N, YY°YY'YY.YY"E" and "Park A, Near fountain, xx°xx'x.xx-"N,yy°yy'yy.yy"E." The device type data indicates the type of a device 200. The device data storing module 60 stores "Web camera" for the devices. The function data indicates an executable function of a device 200. The device data storing module 60 stores "Taking moving image, Taking still image, Using timer" for the devices.

The data stored by the device data storing module 60 may be other than the above-mentioned data or may be any one of the above-mentioned data. The device type of a device 200 is a web camera in this embodiment but may be an above-mentioned device or item other than a web camera. In this case, the device data storing module 60 only has to store the device identifier, the tag data, the location data, the device type data, the function data, and other data of a device or an item other than a web camera in the same way. The number of keywords stored as tag data is not limited to and may be more or less than that of this embodiment. The respective numbers and types of keywords and GPS data stored as location data is not limited to and may be more or less than those of this embodiment.

The device data storing module 60 may acquire and store the above-mentioned data from a different data base, server, etc. connected with a public line network 3. Especially, the device type data and the function data may be acquired and stored from a data base, a server, etc., providing from the manufacturer, for example, a manufacturer data base and a manufacturer server based on the received device identifier and tag data.

Then, the program setting module 51 of the device retrieval server 10 sets a program to execute an executable function of the device 200 based on the stored function data (step S13). In the step S13, the program setting module 51 acquires a program corresponding to each function of the device 200 from the manufacturer DB, the product DB, etc. based on the received function data. Based on the acquired program, the program setting module 51 sets a program to transmit a function execution request to the device 200 in response to the function execution instruction request to be described later that is transmitted from the user terminal 100, to make the device 200 execute this function, to receive a function result from the device 200 as the execution result of the function, and to transmit this received execution result to the user terminal 100.

The set program transmitting module 52 of the device retrieval server 10 transmits the set program to the device 200 (step S14). In the step S14, for example, the program transmitted from the device retrieval server 10 is to start and to end taking a moving image based on a command from the device retrieval server 10 when the device 200 takes a moving image, to take a still image based on a command from the device retrieval server 10 when the device 200 takes a still image, or to take an image on a specified date and time based on a command from the device retrieval server 10 when the device 200 takes an image with the timer.

The set program receiving module 251 of the device 200 receives the set program transmitted from the device retrieval server 10. The set program store module 270 of the device 200 stores the received set program (step S15). The function execution module 260 of the device 200 executes a function specified from the function execution request to be described later that is received from the device 200 based on the set program received in the step S15 and transmits the execution result of the function to the device retrieval server 10.

Device Retrieval Process

FIG. 5 shows a flow chart of the device register process executed by the device retrieval server 10, the user terminal 100, and the device 200. The tasks executed by the modules of the above-mentioned devices are explained below together with this process.

First, the keyword input receiving module 160 of the user terminal 100 judges whether or not the keyword input receiving module 160 receives a keyword input from the user (step S20). The user terminal 100 starts an application to retrieve a device 200 with the desired function in the step S20. This application is, for example, a web browser application or a dedicated device retrieval application.

Figure 7:
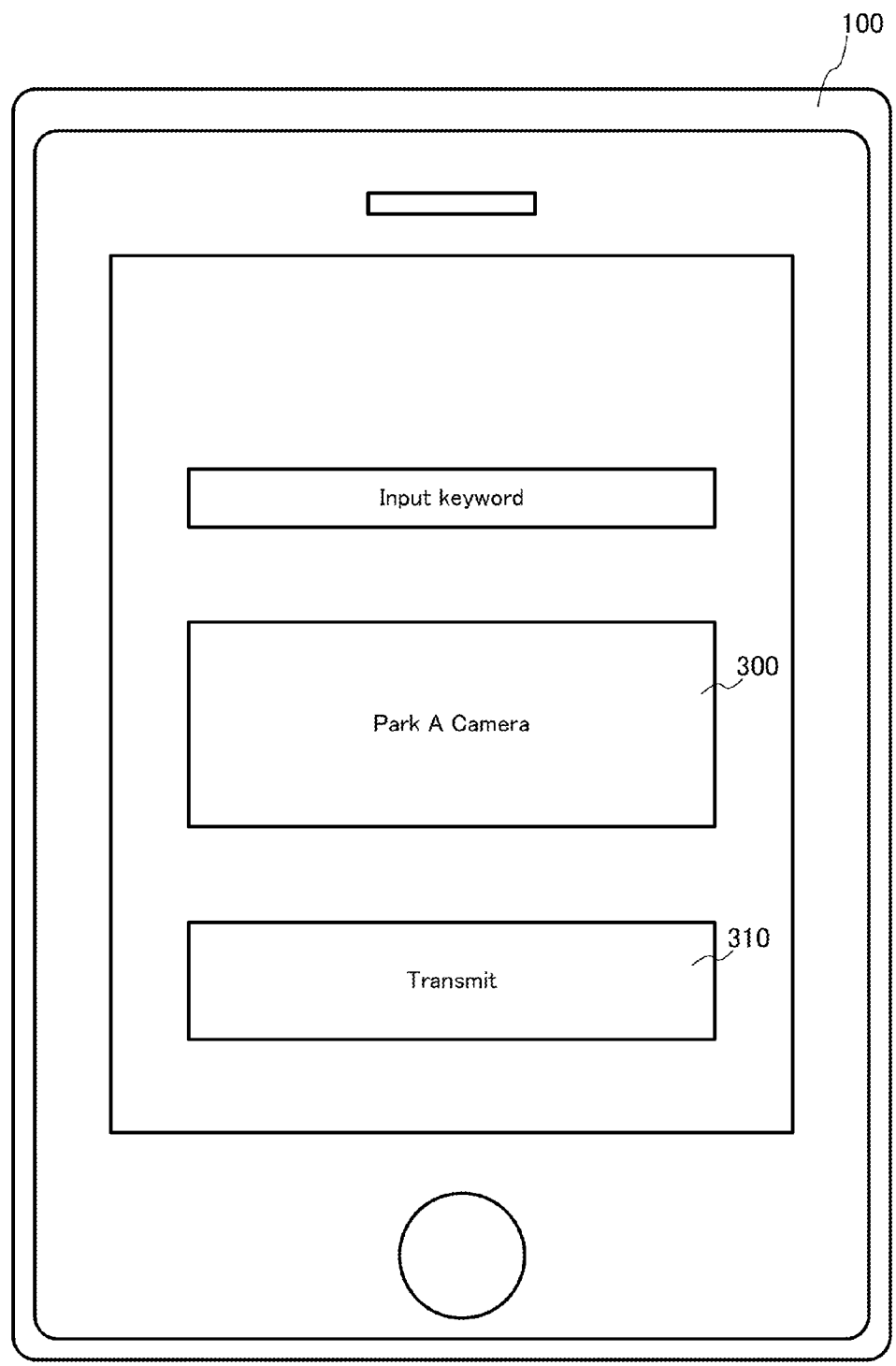
FIG. 7 shows the keyword input receiving screen displayed on the user terminal 100.

In the step S20, the keyword input receiving module 160 of the user terminal 100 displays the keyword input receiving screen shown in FIG. 7. The keyword input receiving module 160 receives a keyword input in the keyboard entry frame 300. This keyboard entry frame 300 may receive an input by selecting a keyword that the user desires from a plurality of previously registered keywords or by directly inputting a keyword that the user desires. The keyword input receiving module 160 judges whether or not a keyword has been input based on whether or not an input to the keyboard entry frame 300 and an input from the send button 310 have been operated.

In the step S20, if judging that the keyword input receiving module 160 has not received an input of a keyword (NO), the keyword input receiving module 160 repeats this step until receiving an input. On the other hand, if the keyword input receiving module 160 judges that the keyword input receiving module 160 has received an input of a keyword (YES) in the step S20, the keyword transmitting module 150 of the user terminal 100 transmits the received input keyword to the device retrieval server 10 (Step S21).

The keyword receiving module 53 of the device retrieval server 10 receives the keyword transmitted from the user terminal 100. The received keyword retrieval module 61 of the device retrieval server 10 retrieves the received keyword from the device data stored by the device data storing module 60 (step S22). If the received keyword retrieval module 61 judges that the received keyword is contained in the tag data or the location data stored in the device data table from the retrieval result in the step S22, the device data transmitting module 54 of the device retrieval server 10 transmits device data associated with this tag data or location data to the user terminal 100 (step S23). In the step S23, the device data transmitting module 54 transmits a link associated with the device identifier, the tag data, the location data, the device type data, the function data to execute a function of the device 200 to the user terminal 100.

On the other hand, if the received keyword retrieval module 61 judges that the received keyword is not contained in the tag data or the location data stored in the device data table from the retrieval result in the step S22, the device data transmitting module 54 transmits a notification of this judgement to the user terminal 100. The device data receiving module 151 of the user terminal 100 receives the notification transmitted from the device retrieval server 10. The device data display module 161 of the user terminal 100 displays the received notification.

The device data receiving module 151 of the user terminal 100 receives the device data transmitted from the device retrieval server 10. The device data display module 161 of the user terminal 100 displays the received device data on the device retrieval result screen shown in FIG. 8 (step S24).

Figure 8:
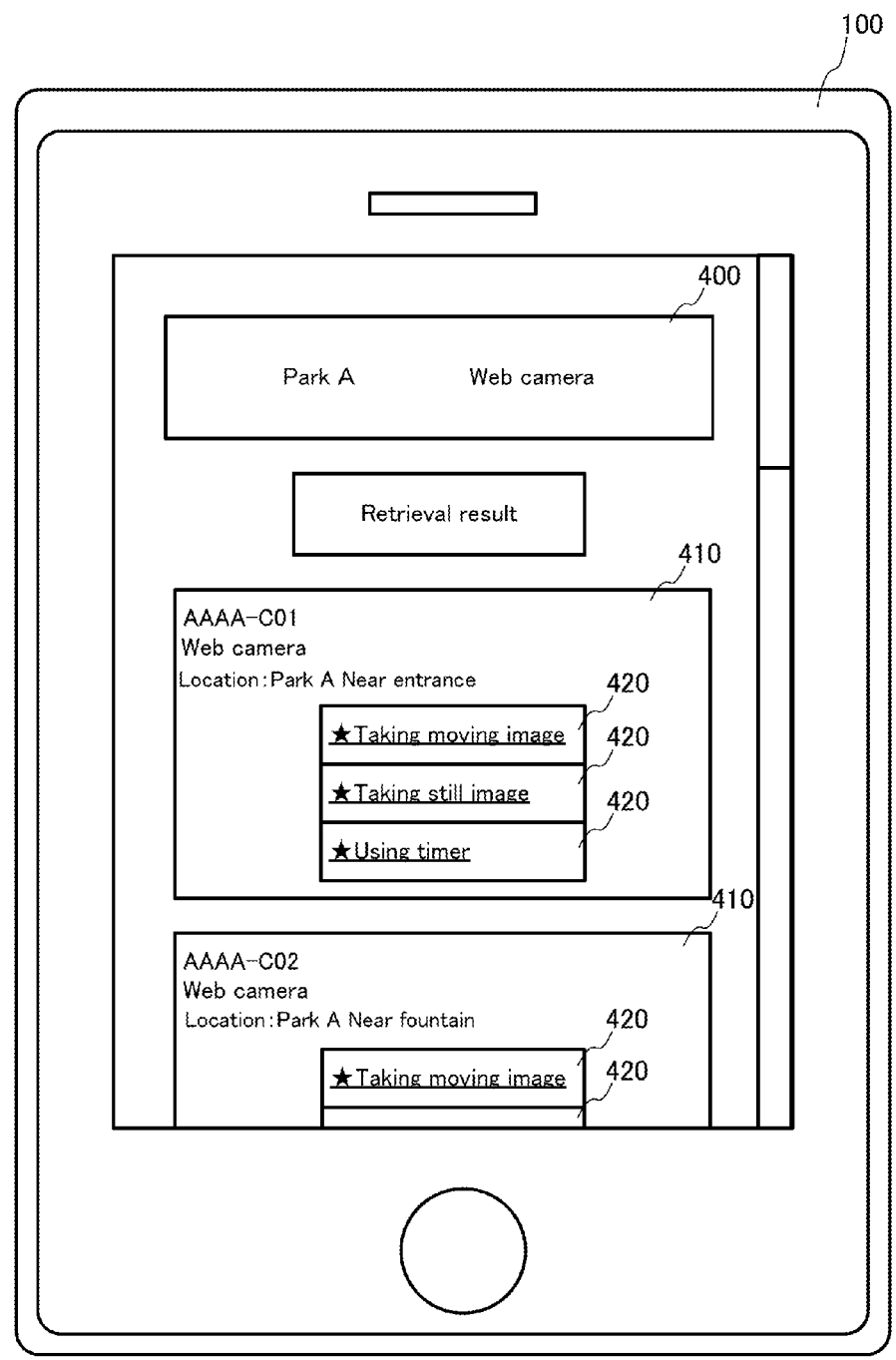
FIG. 8 shows the device retrieval result screen displayed on the user terminal 100.

FIG. 8 shows the device retrieval result screen displayed by the device data display module 161 of the user terminal 100. In FIG. 8, the device data display module 161 displays a keyword display frame 400, a device retrieval frame 410, and a function frame 420. The device data display module 161 displays the keyword input in the step S20 on the keyword display frame 400. The device data display module 161 also displays the device data transmitted from the device retrieval server 10 in the step S23 on the device retrieval frame 410. Specifically, the device data display module 161 displays a device identifier, device type data, and location data on the device retrieval frame 410. The device data display module 161 also displays function data and a link to execute a function indicated by this function data on the function frame 420. For example, when the device 200 is a web camera, the device data display module 161 displays functions such as "taking moving image," "taking still image," and "using timer" together with a link to receive an input from a user on the function frame 420.

In the step S23, the device data display module 161 displays all the input keywords and received device data. Specifically, since the keyword input in the step S20 is "park A Web camera" in this embodiment, the device data display module 161 displays "Park A Web camera" on the keyword display frame 400 and also displays "AAA-C01" and "AAAA-C02" on the device retrieval frame 410 as device identifiers associated with this input keyword. The device data display module 161 also displays tag data and location data on the device retrieval frame 410 and function data on the function frame 420. The device data display module 161 may display the entire device data associated with an input keyword or only a specific device data.

The function data input receiving module 162 of the user terminal 100 judges whether or not the function data input receiving module 162 has received an input for displayed function data from the user (step S25). In the step S25, the function data input receiving module 162 judges whether or not the function data input receiving module 162 has received a tap operation for displayed function data. In the step S25, if judging that the function data input receiving module 162 has not received a tap operation, the function data input receiving module 162 judges that the function data input receiving module 162 has not received an input for function data (NO), to repeat this step. If judging that the function data input receiving module 162 has received a tap operation, the function data input receiving module 162 judges that the function data input receiving module 162 has received an input for function data (YES) in the step S25, the device data transmitting module 153 of the user terminal 100 transmits a device identifier associated with the input function data to the device retrieval server 10 (step S26), and the function execution instruction transmitting module 152 of the user terminal 100 transmits a function execution instruction request to request a function execution instruction indicated by this function data to the device retrieval server 10 (step S27).

The device data receiving module 50 of the device retrieval server 10 receives the device identifier transmitted from the user terminal 100, and the function execution instruction transmitting and receiving module 55 of the device retrieval server 10 receives the function execution instruction request transmitted from the user terminal 100. The function execution instruction transmitting and receiving module 55 of the device retrieval server 10 transmits a function execution instruction to a device 200 with the received device identifier in response to the received function execution instruction request (step S28).

The function execution instruction receiving module 252 of the device 200 receives the function execution instruction transmitted from the device retrieval server 10. The function execution module 260 of the device 200 executes the intended function based on the received function execution instruction (step S29). In the step S29, the function execution module 260 of the device 200 executes the function such as taking moving image, taking still image, or using timer that is instructed from the user terminal 100.

The function execution result transmitting module 253 of the device 200 transmits the execution result of the function executed by the function execution module 260 to the device retrieval server 10 (step S30). In the step S30, the execution result transmitted from the function execution result transmitting module 253 is a taken moving or still image, or a moving or still image taken with the timer, for example.

The function execution result transmitting and receiving module 56 of the device retrieval server 10 receives the execution result of the function that is transmitted from the device 200, and transmits the received execution result of the function to the user terminal 100 (step S31).

The function execution result receiving module 154 of the user terminal 100 receives the execution result of the function that is transmitted from the device retrieval server 10. The function execution result display module 163 of the user terminal 100 displays the received execution result of the function (step S32). In the step S32, the execution result displayed by the function execution result display module 163 is a taken moving or still image, or a moving or still image taken with the timer.

This embodiment is explained assuming that the device 200 is a web camera. However, the device 200 may be a different item as described above. In this case, a function corresponding to the item and the execution result of the function only have to be displayed.

To achieve the means and the functions that are described above, a computer (including CPU, an information processor, and various terminals) reads and executes a predetermined program. For example, a program is provided in forms recorded in a computer-readable record medium such as a flexible disk, a CD (e.g., CD-ROM), or a DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to that described in the embodiments of the present invention.

REFERENCE SIGNS LIST

1 Device retrieval system
10 Device retrieval server
100 User terminal
200 Device

What is claimed is:

1. A device retrieval server retrieving a device, the device retrieval server being communicatively connected with the device, comprising:
    a device data storing unit that stores information on each of a plurality of devices, the information on each of the devices including an identifier, location data and function data of a corresponding device, and the function data representing various functions being executable on the corresponding device;
    a receiving unit that receives a retrieval request for a location and a function from a user terminal; and
    a retrieval result transmitting unit that retrieve one or more devices corresponding to the location and function of the retrieval request by referring to the information on each of the devices stored in the device data storing unit in response to the retrieval request and transmits an identifier and function data of the one or more devices to the user terminal.

2. The device retrieval server according to claim 1, wherein the retrieval result transmitting unit further transmits a link to execute the various functions of the one or more devices.

3. A method of retrieving a communicatively connected device, comprising:
    storing information on each of a plurality of devices, the information on each of the devices including an identifier, location data and function data of a corresponding device, and the function data representing various functions being executable on the corresponding device;
    receiving a retrieval request for a location and a function from a user terminal; and
    retrieving one or more devices corresponding to the location and function of the retrieval request by referring to the information on each of the devices in response to the retrieval request and transmitting an identifier and function data of the one or more to the user terminal.

4. A non-transitory computer readable medium for use in a device retrieval server retrieving a device, the device retrieval server being communicatively connected with the device, comprising a non-transitory computer usable medium having a set of instructions physically embodied therein, the set of instructions including computer readable program code, which when executed by the device retrieval server causes the information processing unit to:
    store information on each of a plurality of devices, the information on each of the devices including an identifier, location data and function data of a corresponding device, and the function data representing various functions being executable on the corresponding device;

receive a retrieval request for a location and a function from a user terminal; and retrieve one or more devices corresponding to the location and function of the retrieval request by referring to the information on each of the devices in response to the retrieval request and transmit an identifier and function data of the one or more devices to the user terminal.

5. The device retrieval server according to claim 1, further comprising:

a function execution instruction transmitting and receiving module that receives a function execution instruction request including an identifier of a device selected by the user terminal from among the one or more devices and a function selected by the user terminal from among the various functions represented by the function data of the selected device, and instructs the selected device to execute the selected function.

6. The device retrieval server according to claim 5, wherein the function execution result transmitting and receiving module receives an execution result of the selected function from the selected device, and transmits the execution result to the user terminal.

7. The device retrieval server according to claim 1, wherein the information on each of the devices further includes tag data tagging keywords including the location and function.

8. The method according to claim 3, further comprising:

receiving a function execution instruction request including an identifier of a device selected by the user terminal from among the one or more devices and a function selected by the user terminal from among the various functions represented by the function data of the selected device, and instructing the selected device to execute the selected function.

9. The method according to claim 8, further comprising:

receiving an execution result of the selected function from the selected device, and transmitting the execution result to the user terminal.

10. The method according to claim 3, wherein the information on each of the devices further includes tag data tagging keywords including the location and function.

11. The non-transitory computer readable medium according to claim 4, wherein the set of instructions including computer readable program code further causes the information processing unit to receive a function execution instruction request including an identifier of a device selected by the user terminal from among the one or more devices and a function selected by the user terminal from among the various functions represented by the function data of the selected device, and instruct the selected device to execute the selected function.

12. The non-transitory computer readable medium according to claim 11, wherein the set of instructions including computer readable program code further causes the information processing unit to receive an execution result of the selected function from the selected device, and transmit the execution result to the user terminal.

13. The non-transitory computer readable medium according to claim 4, wherein the information on each of the devices further includes tag data tagging keywords including the location and function.

* * * * *